Patented Mar. 24, 1936

2,035,406

UNITED STATES PATENT OFFICE 2,035,406

DEWAXING PARAFFIN DISTILLATES

Audsley V. Rhodes, Linden, N. J., assignor to Standard Oil Development Company, a corporation of Delaware No Drawing. Application May 24, 1933, Serial No. 672,646

2 Claims. (Cl. 210—204)

This invention relates to a process of separating wax and oil and it relates particularly to an improved process for pressing petroleum oil distillates through filter blankets to separate the wax and oil.

In the petroleum industry the distillates containing paraffin wax are chilled and subjected to filtration by passing through filter blankets in a filter press to separate paraffin wax from petroleum oil. When a plate and frame wax press has been blocked with wax from a good pressing paraffin distillate, the press cakes are usually dry and hard and can be cleaned from the blankets with two or three strokes of the spud. Frequently the cakes separate from the blanket when the press is broken and only have to be removed from the ring separating the blankets. When running a poor pressing distillate, i. e., one which contains appreciable amounts of higher molecular weight and therefore higher boiling point waxes, which have smaller and less sharply defined crystals, a sticky cake is obtained. This may be soft and sloppy and so fill the pores of the blanket that the quantity of oil that may be passed through is materially reduced before the cake is dried out, or if the cake is dried it may leave a thin film of very hard sticky wax on the surface of the blanket. In either event, the press cake cannot be removed except by scraping the entire surface of the blanket and even then the small amount of wax remaining in the pores of the blanket reduces appreciably the subsequent quantities of oil that may be passed through.

An object of this invention is to prepare a filter blanket at low cost so that press cakes from stocks containing poor pressing wax can be readily cleaned therefrom, thereby enabling thruputs to be maintained on successive runs with the same blankets without sacrificing cold test reduction.

Another object of this invention is to provide a blanket which will make it possible to press paraffin distillates which have been cut more deeply in the crude and therefore contain larger amounts of poor pressing wax, in particular, poor pressing stocks which contain appreciable amounts of malformed crystals.

It has been found that such a blanket may be prepared by coating (spraying, dipping, or applying with a brush) an ordinary filter blanket of canvas or duck of 8 to 12 oz. weight with a solution of soluble silicate such as sodium silicate, followed by air drying. A used blanket may, after washing or steaming, have the silicate coating renewed from time to time.

Since the solution of silicate may, if not properly spread, fill some of the pores of the blanket, it is advisable to roll or bend the dry coated blanket in order to remove this material from the pores. It may then be used as a filter blanket in the usual way.

For example, in an experiment carried out on a semi-plant scale, five blankets were coated with a 25° Baumé gravity solution of sodium silicate and allowed to dry. A plate and frame press was then made by using these blankets. A second press was made up with five canvas blankets of the same weight as those coated with the silicate. A waxy distillate containing considerable amounts of poor crystalline wax and showing upon distillation under 10 mm. vacuum, 95% off at 596° F. was then charged to both presses at 0° F. The press made up with ordinary blankets as well as the press made up with the specially prepared blankets filtered an equivalent of about 220 barrels of oil per 11,000 sq. ft. of filter surface per day. Both oils obtained from these filters passed the cold test at 0° F. The wax cakes in the former press, made up with ordinary blankets, were extremely difficult to clean, there being a hard, thin film of wax which coated the entire surface of the ordinary blanket and could be removed only by scraping with a sharp instrument. In view of the fact that this scraping could not remove the wax from the pores of the blanket, succeeding runs through this press showed that after a number of runs the quantity of oil that could be passed through this filter was less than an equivalent of 100 barrels per day on a large press of 11,000 square feet filtering surface. In the other press, however, the cakes could be cleaned from the specially coated blanket quite readily merely by starting with the spud. The presence of the sodium silicate coating effectively prevented the deposition of the hard, thin film of wax on the surface and facilitated the complete removal of wax cake. In five successive runs using the same blankets quantities of oil equivalent to 213, 219, 238, 192 and 213 barrels per day on 11,000 sq. ft. of filtering surface were obtained, showing that there was no accumulation of poorly formed wax on the blanket.

Blankets prepared in this way have been used as often as twenty times and still showed satisfactory cleaning of the wax from poor pressing stocks.

The foregoing description is illustrative of the invention and various changes in the alternative arrangements may be made within the scope of the appended claims in which it is my intention to claim all novelty inherent in the invention as broadly as the prior art permits.

I claim:

1. A method of forming a porous diaphragm suitable for separating paraffin wax from a petroleum distillate, which comprises coating a canvas blanket with sodium silicate, drying the sodium silicate on the canvas blanket and opening the closed pores of the canvas blanket coated with sodium silicate by bending.

2. A method of forming a porous diaphragm suitable for separating paraffin wax from a petroleum distillate, which comprises the steps of coating a canvas blanket with a solution of sodium silicate, drying the sodium silicate on the canvas blanket, bending the coated canvas blanket to open the closed pores to allow the passage of oil through said pores while stopping the passage of paraffin wax through said pores.

AUDSLEY V. RHODES.